United States Patent Office 3,737,305
Patented June 5, 1973

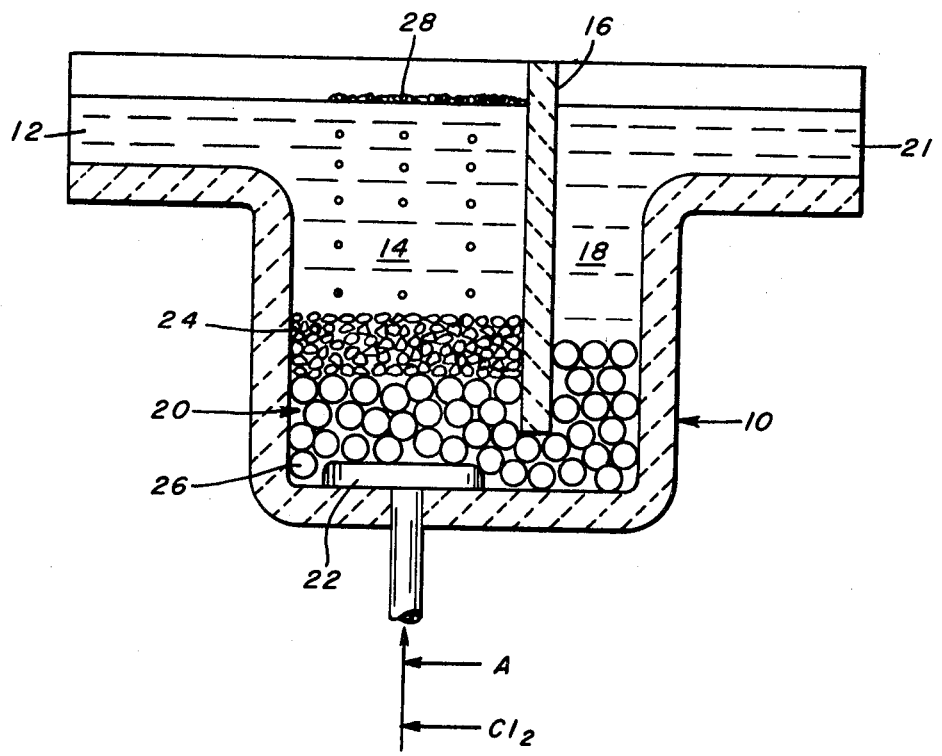

3,737,305
TREATING MOLTEN ALUMINUM
Lee C. Blayden, New Kensington, Kenneth J. Brondyke, Oakmont, and Robert E. Spear, Murrysville, Pa., assignors to Aluminum Company of America, Pittsburgh, Pa.
Filed Dec. 2, 1970, Ser. No. 94,391
Int. Cl. C22b *21/06*
U.S. Cl. 75—68 R  14 Claims

ABSTRACT OF THE DISCLOSURE

This is an improvement in a molten aluminum refining process of the type described in U.S. Pat. 3,039,864 where a non-reactive fluxing gas is passed through molten aluminum as it moves through a bed of refractory bodies to remove from the aluminum hydrogen gas and non-metallic impurities such as oxides. According to the improvement a relatively small stream of a reactive chlorinaceous fluxing gas introduced along with the non-reactive fluxing gas substantially increases the useful life of the refractory body bed. The process is capable of chlorine fume-free operation.

BACKGROUND AND STATEMENT OF THE INVENTION

U.S. Pat. 3,039,864 to Hess, Brondyke and Jarrett describes a process wherein argon or another non-reactive gas is passed through a bed of refractory bodies in countercurrent flow contact with molten aluminum to remove non-metallic impurities and hydrogen gas from the aluminum. This process is readily capable of removing 70% or more of the dissolved hydrogen gas from the molten aluminum and of very substantially reducing the amount of oxides present in the molten aluminum.

The present invention is an improvement on the type of process described in the Hess et al. patent. According to the improvement the flow of the argon or other non-reactive fluxing gas is supplemented by a comparatively small flow of chlorine or other chlorinaceous gas. The improvement results in a very substantial increase in bed life along with other benefits in operating efficiencies.

DETAILED DESCRIPTION

In the description which follows reference is made to the figure which is a longitudinal section of a schematic arrangement of the type described in U.S. Pat. 3,039,864 and suitable in the practice of the present improvement.

Referring to the figure molten aluminum enters the treatment vessel 10 through inlet 12 and passes downwardly in the down leg 14 on the inlet side of the baffle 16 which divides the vessel 10 into the down leg 14. In the vessel 10 is situated a bed 20 of refractory bodies and the molten metal passes downwardly through the bodies and then upwardly through up leg 18 and exits through outlet 21. As the molten metal passes through the refractory body bed it is contacted with a stream of gas flux which enters the bed through disperser 22. In the arrangement shown the metal is moved downwardly through down leg 14 passing through the refractory body bed 20 in counterflow relation with the gas rising through the bed. The fluxing action of the non-reactive gas flux serves to remove hydrogen gas down to levels of 0.15 ml. or less per 100 grams of aluminum and non-metallic impurities such as oxides down to 4 parts per million and less.

In accordance with the present improvement the useful life of the refractory body bed is markedly improved by the use of a comparatively small amount of chlorine or other reactive chlorinaceous gas flux in addition to the non-reactive gas flux. The chlorinaceous gas flux is introduced substantially continuously and concurrently with the non-reactive gas flux. The chlorinaceous gases useful in practicing the improvement include vaporous chlorides such as aluminum chloride and hexachloraethane although it is much preferred to use chlorine gas as it is economical and compatible with existing facilities. The non-reactive fluxing gas can be any of those disclosed in the Hess et al. patent including the inert gases of the periodic table, helium, neon, argon, krypton and xenon and mixtures thereof, with argon being preferred because of its relatively low cost and its availability. In addition nitrogen or carbon dioxide may be employed although precautions are warranted to avoid the formation of nitrides, oxides, carbides and complexes thereof. All these gases are considered "inert" or non-reactive in the practice of the invention.

The amount of the non-reactive fluxing gas varies from about 0.005 to 0.5 standard cubic foot per hour (s.c.f.h.) per square inch of refractory body bed cross sectional area in a plane normal to the gas travel, that is the horizontal plane in the figure which is normal to the upward gas flow. The invention contemplates molten metal flow rates of 5 to 75 pounds per hour per square inch of refractory body bed cross sectional area measured in a plane normal to the metal travel, a horizontal plane in the embodiment shown in the figure. Another way of expressing non-reactive gas flux flow rate is as related to metal flow, the gas flow amounting to from less than 1 to about 100 standard cubic feet per thousand pounds of metal.

The chlorinaceous gas is introduced in an amount to provide the equivalent of about 1 to 10 parts chlorine to about 99 to 90 parts of the non-reactive fluxing gas on a volume basis. A preferred proportion is 2 to 5 parts of chlorine to 98 to 95 parts of the non-reactive fluxing gas. The foregoing proportions provide the best and most consistent results, although, on a broader but less preferred basis many of the benefits of the present improvement can be achieved with as much as 20 parts or more of chlorine for each 100 parts of the non-reactive fluxing gas. The amount of the chlorinaceous gas flux preferably provides from about 0.00025 to 0.02 s.c.f.h. of chlorine per square inch of bed cross sectional area measured in a plane normal to the direction of the gas flow, a horizontal plane in the embodiment shown in the figure. A typical level is 0.01 s.c.f.h. per square inch of bed section for a bed about 20 inches deep. The chlorinaceous gas flow rate can also be expressed as a function of molten aluminum moving through the bed and a rate to provide 0.004 to 4 s.c.f. chlorine per thousand pounds of molten aluminum is preferred. These comparatively minuscule amounts produce no chlorine gas effluent above the melt surface. That is, chlorine measurements made with a Mine Safety Appliances Company detector tube for chlorine and universal sampling pumps indicate zero parts per million chlorine in the atmosphere immediately above the molten metal in down leg 14. Thus the improvement can be operated to produce no pollutants to the atmosphere rendering its advantages all the more attractive where pollution is a matter of concern.

The respective fluxing gases can be introduced to the refractory bed separately as by a separate disperser for each gas. However, it is highly preferred that the chlorinaceous and the non-reactive fluxing gases be mixed to provide a substantially homogeneous mixture which is continuously introduced through a common dispersing system as shown in the figure. Pre-mixing can be effected by combining the respective gas streams in a common conduit and facilitates a highly uniform distribution of each fluxing gas through the refractory body bed. The gas flux mixture should be introduced by spreading the gases substantially uniformly across substantially the entire cross section, or at least a substantial portion, of the fluxing region of the refractory body bed, the fluxing region being down leg 14 in the embodiment shown in the figure.

The Hess et al. patent indicates that chlorine is not suitable as the non-reactive fluxing gas and, in the amounts contemplated for the non-reactive fluxing gas, such is certainly true. However, in the relatively small amounts of chlorinaceous gas specified in connection with the present improvement, that is, relatively small in comparison with the amount of the non-reactive fluxing gas concurrently introduced therewith, no disadvantages are encountered. On the contrary, a very substantial increase in bed life is achieved by the use of the supplemental small chlorinaceous gas stream.

The chlorinaceous gas will perform a function for which it is known in contacting molten aluminum melts, that being to remove sodium and other metallic impurities more electropositive than aluminum. This benefit is also achieved in practicing the present improvement although the present bed life improvement is realized even in substantially sodium-free molten aluminum. Further, the chlorinaceous gas can be introduced in an amount stoichiometrically deficient to react with the sodium present to reduce it to presently desired levels which are as low as 0.0002% and even lower. Reaction products formed by chlorine reactions with metallic impurities, to the extent they may be formed, are continuously flushed from the refractory body bed by the non-reactive gas flux as are non-metallic inclusion particles such as oxide particles removed from the molten aluminum in the bed. The chlorinaceous gas seems to de-wet the non-metallic particles such that their removal from the bed entrains substantially no molten aluminum. The non-metallic particles and chlorine reaction products flushed from the refractory body bed rise to the surface of the molten aluminum to form a skim 28 which can be removed periodically. The skim is of the so-called "dry" type containing substantially no molten aluminum but containing only solid particles of oxides and some sodium chloride, a dry solid. It normally contains no evidence of any liquid salt. The continuous flushing of chlorine reaction products from the refractory body bed actually improves the efficiency of the chlorination of metallic impurities more electropositive than aluminum and, from this standpoint, the present invention can be considered an improvement on the process described in U.S. Pat. 3,025,155 to Lee, Brondyke and Hess, relating to chlorination of molten aluminum. Accordingly the one embodiment of the invention contemplates treating molten aluminum containing an impurity metal more electropositive than aluminum, for instance sodium, in a significant amount, typically from 0.001% or less up to about 0.005%. Such impurity metals can be reduced by 75% or more and down to levels of 0.0002% or even to 0.0001% and less in the practice of the present invention.

The figure shows a counterflow relation between the molten aluminum and the gas flux which arrangement is preferred since it favors longer gas-liquid contact times. However, the advantages of the invention are also largely achieved with other arrangements such as co-current flow.

Operating temperature is about 1250° to 1500° F., with a range of 1300° to 1400° F. being preferred. Some sort of heating means, not shown, are employed to maintain proper temperature. Suitable means include internal immersion heaters, fired or electrical or external heaters.

Turning to the refractory body bed, one preferred practice contemplates that at least a portion 24 of the bed is made up of refractory granules ranging in size from 3 to 14 mesh. This portion of the bed is typically about 10 inches deep although a depth of 4, and preferably at least 6, to 20 inches can be employed to good advantage. The use of the granular bed assures very high utilization of the non-reactive gas flux in removing gas and oxide particle impurities. The refractory granule portion 24 of the bed can be supported upon a portion 26 of larger refractory bodies of at least ¼ inch and preferably at least ½ inch in size, ¾ to 1 inch sized bodies serving this purpose quite well. The supporting bed 26 can vary from about 2 to 10 inches or even more in depth. The depth of a bed is considered to be the submerged depth above the disperser, that is the bed depth where flux gases are contacting the molten metal. The respective gas fluxes are introduced into the supporting bed such that they can travel through the supporting bed 26 and into the finer granule bed 24.

As indicated in the Hess et al. patent the refractory bodies are inert toward the molten aluminum being treated and have a higher melting point. Among such substances are chromite, corundum, forsterite, magnesia spinel, periclase, silicon carbide and zircon. Tabular alumina (synthetic corundum) appears to offer a number of advantages and is preferred for the refractory bodies. Along the lines also indicated in the Hess et al. patent, it is desirable prior to initially operating the improved arrangement that the refractory bodies be preheated to a temperature of 1200 to 1600° F., preferably above 1400° F., and then added to the container which has been initially provided with molten metal sufficient to cover the refractory body bed. Thereafter, molten metal is passed through the bed. This technique is especially suited where the bed contains relatively small granules such as portion 24 in the figure which contains granules of —3 +14 in size. In this method of preparation the fluxing gas should be introduced prior to commencement of metal flow to treat the initial body of molten metal if such is desired. Additional information concerning this method of refractory body bed preparation can be found in U.S. Pat. 2,863,558 to Brondyke and Stroup.

To illustrate the advantages achieved by the practice of the invention, the following example proceeds. A unit of the type shown in the figure was run with only argon gas as specified in the Hess et al. Pat. 3,039,864. The treatment was performed at a molten aluminum flow rate of about 8000 pounds per hour which translates to about 12 pounds of metal per hour per square inch of down leg cross sectional area. The aluminum alloy treated was Alloy 6063, containing nominally 0.7% magnesium and 0.4% silicon and the treatment temperature was 1320° F. The argon flow rate was 40 s.c.f.h. The treatment was continuously run for a period of about 3 weeks after which it became necessary to temporarily interrupt the operation to replace the refractory body bed as the pressure drop across the bed started to increase as indicated by a 3 to 4 inch head differential between the inlet 12 and outlet 21 levels, referring to the figure. The refractory body bed included a 10 inch portion of granules 3 to 14 mesh in size and after removal this portion of the bed exhibited a considerable amount of non-metallic inclusions and appeared "dirty" or "gritty." Under the same conditions with respect to metal composition and flow rate and argon flow rate, a small amount of chlorine was pre-mixed with the argon gas. The respective proportions were about 1 part chlorine to about 40 parts argon. The treatment achieved the same results with respect to removal of non-metallic inclusions and hydrogen as did the previous treatment using only argon as the gas flux. However, the treatment which included the minuscule amount of chlorine was run for over 1 month continuously without any interruption and no increase in pressure drop in that the inlet-outlet level differential remained unchanged from initial conditions. The run was terminated shortly after over one month for reasons having no connection with pressure drop. The marked effect of a minuscule amount of chlorine on the refractory body bed life in the type of metal treatment process under consideration is thus readily appreciated. Examination of 3 to 14 mesh refractory granules removed from beds where the present improvement was employed revealed a very clean granule condition and an absence of "dirt" or "grit." In addition, the chlorine reduced the sodium content of the molten aluminum from about 0.0005% to 0.0000%.

While the invention has been described in terms of preferred embodiments, the claims appended hereto are intended to encompass all embodiments which fall within the spirit of the invention.

What is claimed is:

1. In the process of treating molten aluminum for the substantial removal therefrom of gas and finely divided non-metallic particle impurities wherein molten aluminum is passed through a bed of submerged refractory bodies 3 to 14 mesh in size in contact with a non-reactive fluxing gas, the improvement comprising introducing a reactive chlorinaceous gas flux in an amount that is relatively small in comparison with the amount of non-reactive gas flux and the resulting gas flux mixture is moved through said refractory body bed and in contact with said molten aluminum passing therethrough, said improvement substantially extending the useful life of said refractory body bed.

2. The method according to claim 1 wherein the chlorinaceous gas is continuously introduced in an amount to provide a proportion of up to about 20 parts chlorine to about 100 parts of the non-reactive gas flux.

3. The method according to claim 1 wherein the chlorinaceous gas is continuously introduced in an amount to provide a proportion of up to about 1 to 10 parts chlorine to about 99 to 90 parts of the non-reactive gas flux.

4. The method according to claim 1 wherein the chlorinaceous gas is introduced in an amount to provide a proportion of about 2 to 5 parts chlorine to about 98 to 95 parts of the non-reactive gas flux.

5. The method according to claim 1 wherein the flow rate for the non-reactive gas flux is from 0.005 to 0.5 s.c.f.h. per square inch of refractory body cross section.

6. The method according to claim 1 wherein the chlorinaceous and non-reactive fluxing gases are pre-mixed to provide a substantially homogeneous gas flux mixture which mixture is introduced to the refractory body bed.

7. The method according to claim 1 wherein the refractory bodies are tabular alumina.

8. The method according to claim 1 wherein the 3- to 14-mesh refractory bodies are supported by a bed of coarser refractory bodies and the fluxing gases are introduced into the supporting bed.

9. The method according to claim 1 wherein the chlorinaceous gas is chlorine.

10. The method according to claim 9 wherein the chlorine is introduced at a rate of 0.00025 to 0.02 s.c.f.h. per square inch of refractory body bed cross section.

11. The method according to claim 1 wherein the molten aluminum contains sodium which is substantially removed.

12. The method according to claim 11 wherein the chlorine is introduced at a rate of 0.00025 to 0.02 s.c.f.h. per square inch of refractory body bed cross section.

13. In the method of treating molten aluminum for the substantial removal therefrom of gas and finely divided non-metallic particle impurities wherein molten aluminum is passed through a bed of submerged refractory bodies in contact with a non-reactive fluxing gas, the improvement comprising pre-mixing the non-reactive fluxing gas with a relatively small amount of a reactive chlorinaceous gas to provide a homogeneous gas mixture containing up to about 20 parts chlorine to 100 parts of the non-reactive fluxing gas and continuously introducing said mixture to said bed by spreading said mixture substantially uniformly across substantially the entire cross section of the fluxing region of said bed, said improvement substantially extending the useful life of said refractory body bed.

14. A method of treating molten aluminum comprising
(1) passing said molten aluminum downwardly through a bed of submerged tabular alumina refractory bodies 3 to 14 mesh in size,
(2) pre-mixing a non-reactive gas flux and a chlorine gas flux to provide a homogeneous gas mixture containing about 1 to 10 parts chlorine to about 99 to 90 parts of the non-reactive gas flux, the non-reactive gas flux being provided in an amount ranging from 0.005 to 0.5 s.c.f.h. per square inch of refractory body cross section,
(3) introducing said homogeneous fluxing gas mixture to said bed by spreading the gas mixture substantially uniformly across substantially the entire cross section of the fluxing region of said bed, and passing said gas mixture through said bed in counterflow contact with said molten aluminum thereby to effect substantial reduction of gas and finely divided non-metallic particle impurities in said aluminum while substantially extending the useful life of said refractory body bed.

References Cited

UNITED STATES PATENTS

| | | | |
|---|---|---|---|
| 3,025,155 | 3/1962 | Lee et al. | 75—68 R |
| 3,087,808 | 4/1963 | Gottschalk | 75—68 R |
| 3,537,987 | 11/1970 | Copeland | 75—68 R X |
| 2,840,463 | 6/1958 | Stroup et al. | 75—68 |
| 3,149,960 | 9/1964 | Robinson | 75—68 |
| 3,039,864 | 6/1962 | Hess et al. | 75—68 X |

L. DEWAYNE RUTLEDGE, Primary Examiner

M. J. ANDREWS, Assistant Examiner

U.S. Cl. X.R.

210—69